United States Patent
Shen et al.

(10) Patent No.: US 6,355,102 B2
(45) Date of Patent: *Mar. 12, 2002

(54) COATING APPLICATOR FOR PRODUCING OPTICAL FIBER RIBBON WITH IMPROVED GEOMETRY

(75) Inventors: Steven X. Shen, Hickory; Houching M. Yang, Conover; Patrick Bourghelle, Hickory, all of NC (US)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,836

(22) Filed: Jul. 14, 1998

(51) Int. Cl.$^7$ ............................... B65C 11/02
(52) U.S. Cl. ....................... 118/125; 118/420
(58) Field of Search .................. 425/114; 264/136; 118/420, 125, DIG. 18, 234; 65/529

(56) References Cited

U.S. PATENT DOCUMENTS

| | | | |
|---|---|---|---|
| 3,042,570 A | * | 7/1962 | Bradt |
| 3,332,393 A | | 7/1967 | Hoover |
| 3,402,696 A | * | 9/1968 | Richards |
| 3,874,329 A | | 4/1975 | McLarty |
| 4,243,445 A | | 1/1981 | Seguin |
| 4,643,126 A | | 2/1987 | Wilkinson et al. |
| 4,720,165 A | | 1/1988 | Tokuda et al. |
| 4,864,964 A | | 9/1989 | Hilakos |
| 4,957,422 A | * | 9/1990 | Glemet et al. |
| 5,268,050 A | * | 12/1993 | Azari |
| 5,486,378 A | | 1/1996 | Oestreich et al. |
| 5,529,652 A | * | 6/1996 | Asao et al. |
| 5,879,602 A | * | 3/1999 | Scheuring |
| 5,928,712 A | | 7/1999 | Unterberger et al. |

FOREIGN PATENT DOCUMENTS

| | | |
|---|---|---|
| DE | 3733124 | 4/1989 |
| DE | 4233907 | 4/1994 |
| EP | 0438668 | 7/1991 |
| JP | 6-63482 | 3/1994 |
| JP | 6-63483 | 3/1994 |

OTHER PUBLICATIONS

European Patent Office Search Report dated Oct. 21, 1999 (3 pages).

\* cited by examiner

*Primary Examiner*—Brenda A. Lamb
(74) *Attorney, Agent, or Firm*—Ware, Fressola, Van Der Sluys & Adolphson LLP

(57) ABSTRACT

A coating applicator for continuously applying matrix material to a plurality of optical fibers arranged in a ribbon configuration is described. The coating applicator has a first contacting means for contacting the plurality of optical fibers on a first side of the plurality of optical fibers and for contacting a first end fiber of the plurality of optical fibers. The coating applicator also has a second contacting means for contacting the plurality of optical fibers on a second side of the plurality of optical fibers and for contacting a second end fiber of the plurality of optical fibers. The second contacting means is located downstream of the first contacting means, and is located relative to the first contacting means so that the optical fibers are forced to contact the first and second contacting means as described above.

7 Claims, 6 Drawing Sheets

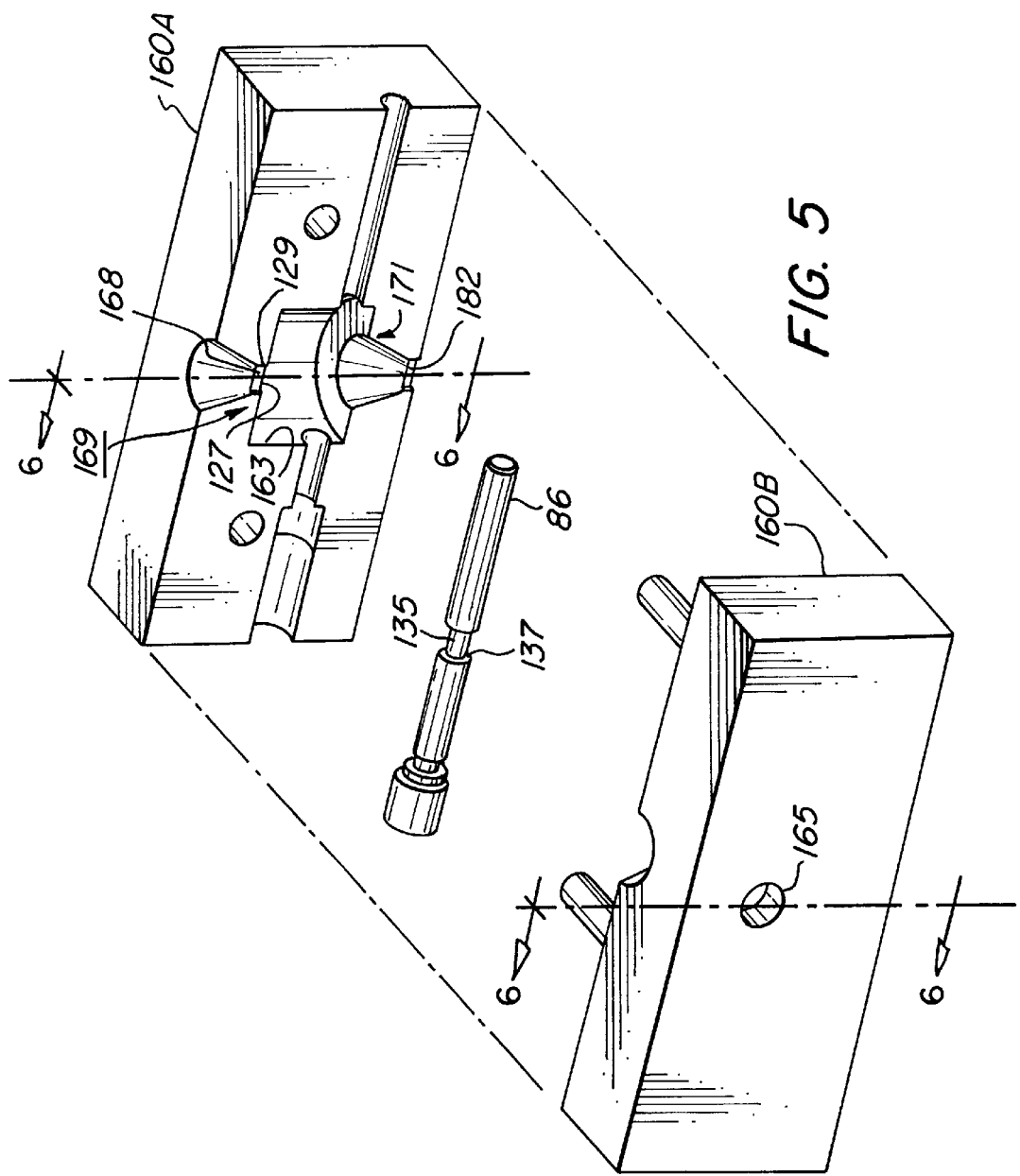

COATING APPLICATOR FOR PRODUCING OPTICAL FIBER RIBBON WITH IMPROVED GEOMETRY

BACKGROUND OF THE INVENTION

1. Field of the Invention

The present invention relates generally to coating applicators for applying matrix material to a plurality of optical fibers to produce an optical fiber ribbon. In particular, the present invention relates to a coating applicator for establishing and maintaining desirable geometric characteristics while matrix material is applied to the optical fibers.

2. Discussion of Related Art

In optical fiber ribbon, it is desirable that the optical fiber ribbon have certain geometric characteristics. First, it is desirable to arrange the optical fibers in a planar relationship, which is generally achieved by minimizing the distances between the radial center point of each individual optical fiber and a straight line passing through the optical fibers. Second, it is desirable to uniformly coat the optical fibers so as to minimize variations in the coating thickness. Finally, it is desirable to reduce the gap between optical fibers and keep the gap between optical fibers to a minimum.

Ribbon geometry is important for several reasons. First, if the optical fibers of one ribbon are arranged in a plane and it is desired to splice that ribbon with another ribbon also having optical fibers arranged in a plane, the individual optical fiber ends will be aligned when the two ribbon ends are spliced together, thereby establishing a connection which will efficiently transmit light. Furthermore, if the geometry is uniform and/or if the gap between optical fibers is minimized more ribbons can be stacked in a given space within a cable.

Uniform geometry also reduces the stress experienced by the optical fibers when the cable containing a ribbon is bent or compressed. Such bending and compression may cause the cable components to contact one another in various ways. Such contact applies forces to the external ribbon surface. Irregularities in the ribbon, such as non-uniform coating thickness, may result in one optical fiber experiencing a greater stress than other optical fibers. However, if the ribbon has fewer irregularities, these forces will be distributed over the external ribbon surface and among the optical fibers more evenly.

Prior art coating applicators, such as the resin coating die disclosed in Japanese Patent No. 6-63483(A), for production of optical fiber ribbon permit a plurality of optical fibers to pass through a chamber in which matrix material is applied to the optical fibers. The chamber has an opening through which the optical fibers pass. To achieve some degree of the desirable geometric characteristics, some prior art applicators have a die with a chamber therein which has an opening which is only slightly larger than the optical fiber ribbon. If the opening in the chamber of such a prior art applicator contacts the optical fibers so as to achieve the desirable geometric characteristics described above, the optical fibers may be abraded or pinched as they move through the narrow opening because the optical fibers are bounded on all sides by the narrow opening. However, if the opening does not contact the optical fibers, the geometry of the optical fiber ribbon will be less desirable because the optical fibers are free to move within the opening and within the chamber.

SUMMARY OF THE INVENTION

Accordingly, it is an object of the present invention to provide a coating applicator which produces an optical fiber ribbon with improved geometry.

The foregoing objective is realized by the present invention which comprises a coating applicator for continuously applying matrix material to a plurality of optical fibers arranged in a ribbon configuration. The coating applicator has a first contacting means for contacting the plurality of optical fibers on a first side of the plurality of optical fibers and for contacting a first end fiber of the plurality of optical fibers. The coating applicator also has a second contacting means for contacting the plurality of optical fibers on a second side of the plurality of optical fibers and for contacting a second end fiber of the plurality of optical fibers. The second contacting means is located downstream of the first contacting means, and is located relative to the first contacting means so that the optical fibers are forced to contact the first and second contacting means as described above.

One coating applicator according to the present invention includes a die containing a preliminary matrix material application chamber having a matrix material supply orifice. The preliminary matrix material application chamber has a first preliminary chamber side containing an entrance opening and a second preliminary chamber side containing an exit opening, the second preliminary chamber side being opposite the first preliminary chamber side. The preliminary chamber entrance opening defines a first guide edge for contacting the plurality of optical fibers on a first side of the plurality of optical fibers and for contacting a first end fiber of the plurality of optical fibers. The die further contains a main matrix material application chamber also having a matrix material supply orifice. The main matrix material application chamber has a first main chamber side containing an entrance opening for receiving the optical fibers from the preliminary chamber exit opening and has a second main chamber side containing an exit opening. The second main chamber side is opposite the first main chamber side. Furthermore, the main chamber entrance opening defines a second guide edge for contacting a second side of the plurality of optical fibers and for contacting a second end fiber of the plurality of optical fibers. Finally, the main chamber entrance opening is offset relative to the preliminary chamber entrance opening such that the optical fibers contact the first and second guide edges as described above.

Another applicator according to the present invention includes a die containing a chamber having a matrix material supply orifice. The chamber has a first side containing an entrance opening and a second side containing an exit opening, the second side being opposite the first side. The entrance opening defines an entrance guide edge for contacting the plurality of optical fibers on a first side of the plurality of optical fibers and for contacting a first end fiber of the plurality of optical fibers. Disposed within the chamber is a pin, the pin having a pin guide edge for contacting the plurality of optical fibers on a second side of the plurality of optical fibers and for contacting a second end fiber of the plurality of optical fibers. In this die, the pin is offset relative to the entrance opening such that the optical fibers contact the entrance and pin guide edges as described above.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include:

FIG. 5 is an exploded perspective view of a second embodiment of the coating applicator according to the present invention;

DETAILED DESCRIPTION OF THE INVENTION

Figure 1:
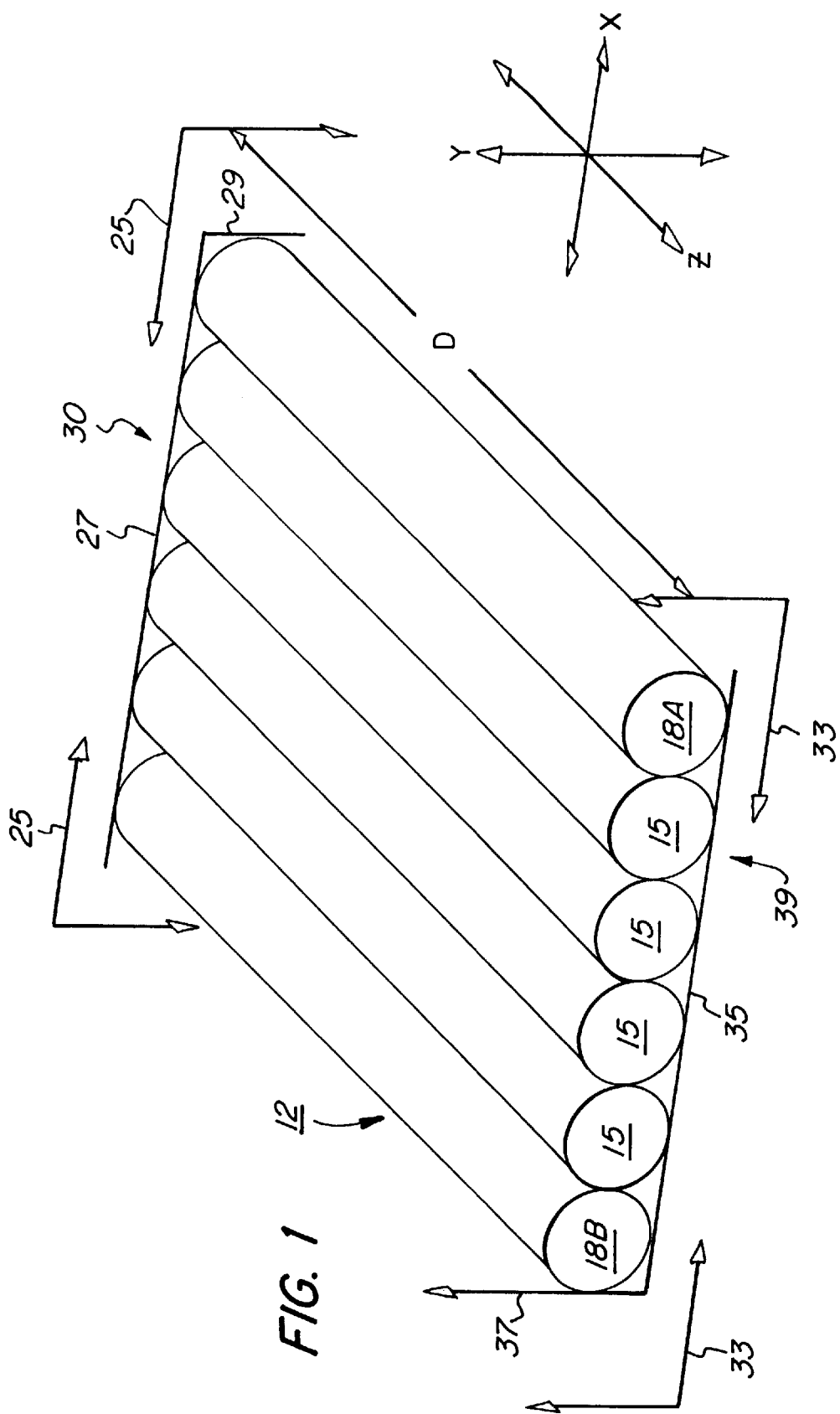
FIG. 1 is a perspective view of the present invention showing first and second guide edges.

A coating applicator according to the present invention will have certain features which are depicted in FIG. 1, and explained in more detail below. In FIG. 1, there is shown a plurality of optical fibers 12 contacting a first major trailing edge 27 and a first minor trailing edge 29. The first trailing edges 27, 29 define a first plane 25 in which the z-axis is normal thereto. The first major trailing edge 27 contacts the plurality of optical fibers 12 on a first side 30 of the plurality of optical fibers 12. The first minor trailing edge 29 contacts a first end fiber 18A.

Also shown in FIG. 1 is a second major trailing edge 35 and a second minor trailing edge 37. The second trailing edges 35, 37 define a second plane 33 in which the z-axis is normal thereto. The second major trailing edge 35 contacts the plurality of optical fibers 12 on a second side 39 of the plurality of optical fibers 12. The second minor trailing edge 37 contacts a second end fiber 18B. Finally, the first plane 25 is spaced from the second plane 33 by a distance D.

As the plurality of optical fibers 12 move through a coating applicator according to the present invention, due to the relative locations of the major trailing edges 27, 35 the optical fibers will be maintained in a planar relationship. Furthermore, due to the relative locations of the minor trailing edges 29, 37, the minor trailing edges 29, 37 will cause any space between adjacent optical fibers to be minimized.

Figure 2:
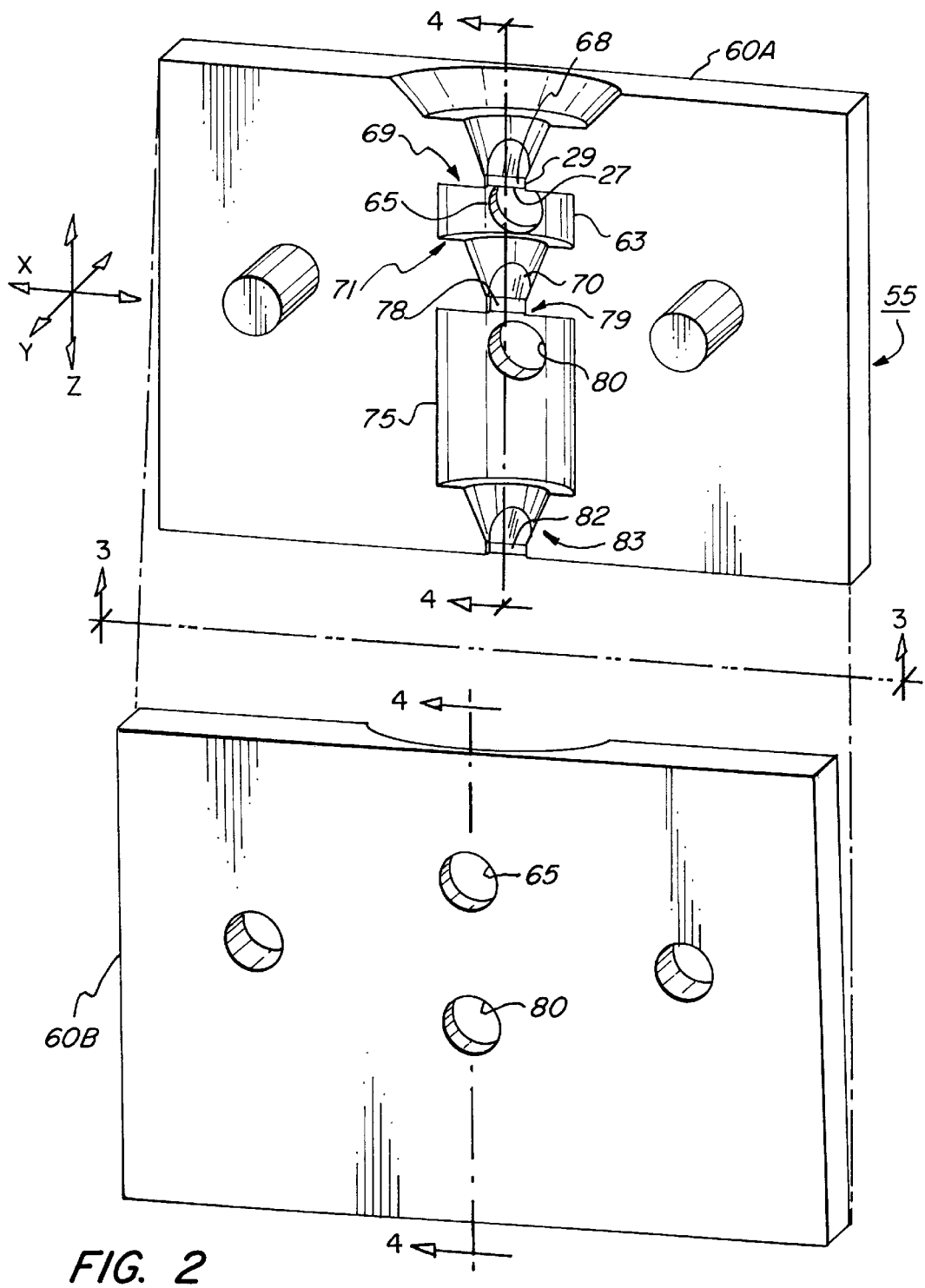
FIG. 2 is an exploded perspective view of a first embodiment of the coating applicator according to the present invention.
Figure 3:
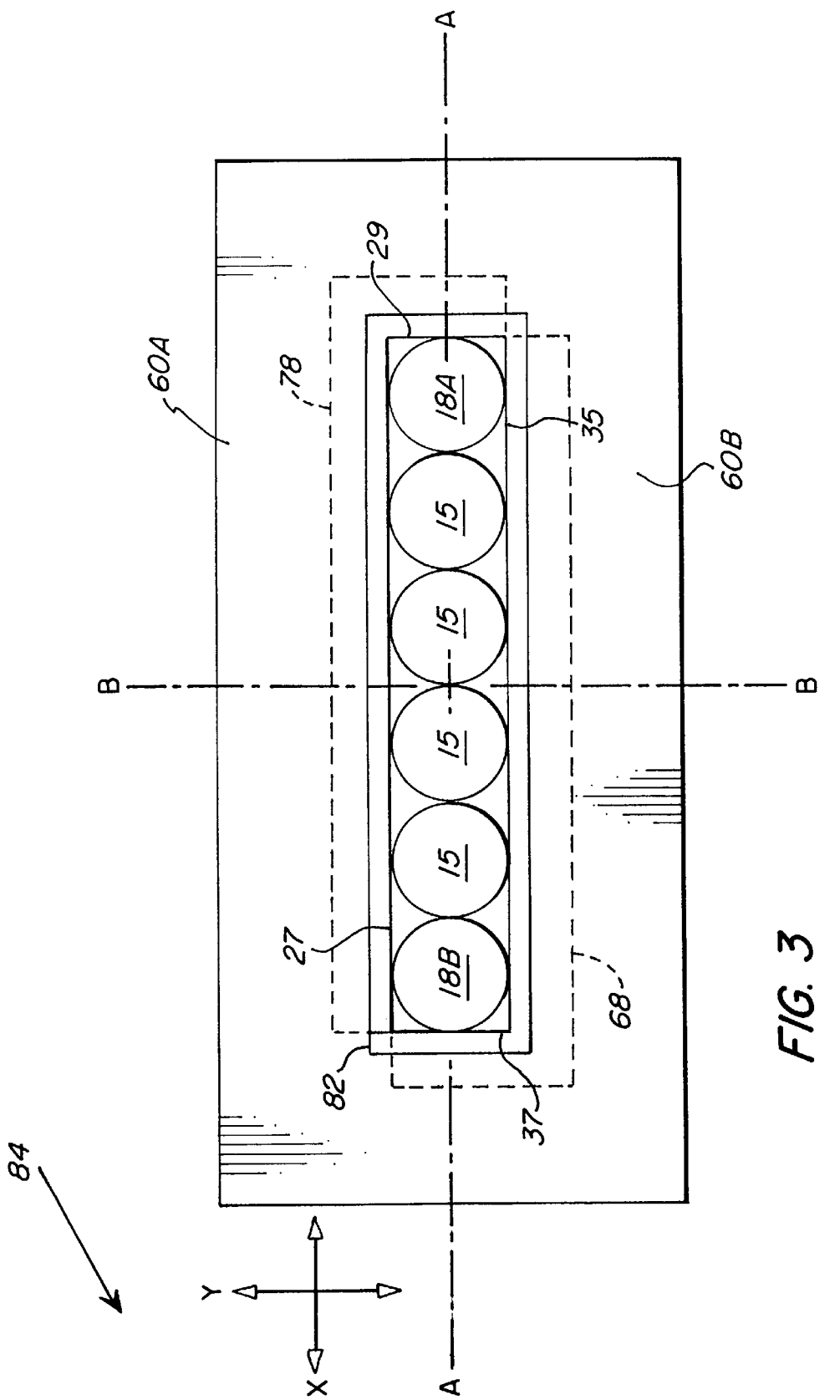
FIG. 3 is an end view of the coating applicator shown in FIG. 2 showing the relative offset positions of the preliminary chamber entrance opening and main chamber entrance opening.

FIGS. 2 and 3 show an embodiment of the present invention. FIG. 2 shows a coating applicator 55 comprised of die blocks 60A, 60B. Die block 60B is substantially a mirror image of die block 60A. When assembled together, the die blocks 60A, 60B define a preliminary matrix material application chamber 63 having an entrance opening 68 in a first side 69 of the chamber 63, an exit opening 70 in a second side 71 of the chamber 63, and a first matrix material supply orifice 65. Also shown is a main matrix material application chamber 75 having an entrance opening 78 in a first side 79 of the main chamber 75, an exit opening 82 in a second side of the main chamber 75, and a second matrix material supply orifice 80.

FIG. 3 shows the embodiment depicted in FIG. 2 viewed from a direction indicated by the line 3—3 in FIG. 2. In FIG. 3 there is shown the preliminary matrix material application chamber entrance opening 68, main chamber entrance opening 78, and exit opening 82. FIG. 3 shows that the preliminary matrix material application chamber entrance opening 68 is offset relative to the main chamber entrance opening 78 such that the major trailing edges 27, 35 contact the optical fibers 15, 18A, 18B to establish the planar relationship between the optical fibers 15, 18A, 18B. The entrance openings 68, 78 are also offset relative to one another such that the minor trailing edges 29, 37 contact a different end fiber 18A, 18B respectively. As shown in FIG. 3, each entrance opening 68, 78 is larger than the plurality of optical fibers 12.

In the embodiment depicted in FIG. 3, the exit opening 82 is centered on center lines A—A and B—B. The preliminary chamber entrance opening 68 is offset relative to the center lines A—A and B—B in a first direction 84 while the main chamber entrance opening 78 is offset relative to center lines A—A and B—B in a second direction opposite to the first direction 84.

Figure 4:
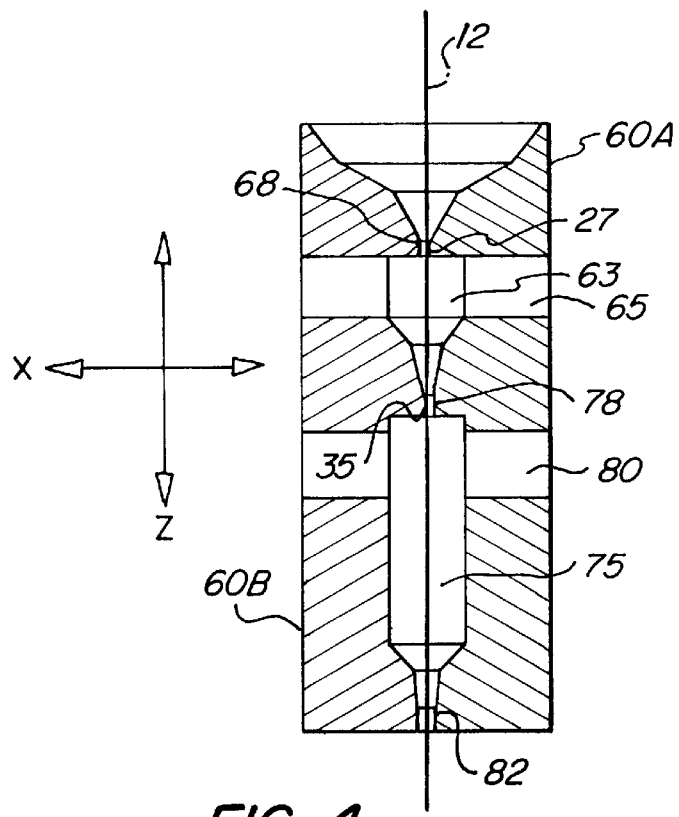
FIG. 4 is a cross-sectional view of the assembled coating applicator shown in FIG. 2 taken along the line 4—4 shown in FIG. 2.

FIG. 4 is a cross-section of the assembled die blocks 60A, 60B taken along and viewed as indicated by the lines 4—4 in FIG. 2. FIG. 4 shows that as the plurality of optical fibers 12 pass through the die blocks 60A, 60B, the plurality of optical fibers 12 contact the first major trailing edge 27 to establish planarity, then pass through the preliminary matrix material chamber 63, where matrix material supplied via the first matrix material supply orifice 65 is applied to the plurality of optical fibers 12. Next, the plurality of optical fibers 12 contact the second major trailing edge 35 to maintain planarity, and then pass through the main matrix material chamber 75, where additional matrix material supplied via the second matrix material supply orifice 80 is applied to the plurality of optical fibers 12. Finally, the coated plurality of optical fibers 12 pass through the exit opening 82.

FIGS. 5–8 show another embodiment of the present invention which includes die blocks 60A, 60B and pin 86. Features of the embodiment depicted in FIGS. 5–8 which are comparable to features depicted in the embodiment shown in FIGS. 2–4 are given the same reference numeral preceded by a "1". As shown in FIG. 5, when assembled together, the die blocks 160A, 160B define a matrix material chamber 163 having an entrance opening 168 and matrix material supply orifice 165. The entrance opening 168 has an entrance major trailing edge 127 and an entrance minor trailing edge 129. Disposed within the assembled die blocks 160A, 160B is pin 86, which includes a pin major trailing edge 135 and a pin minor trailing edge 137.

Figure 6:
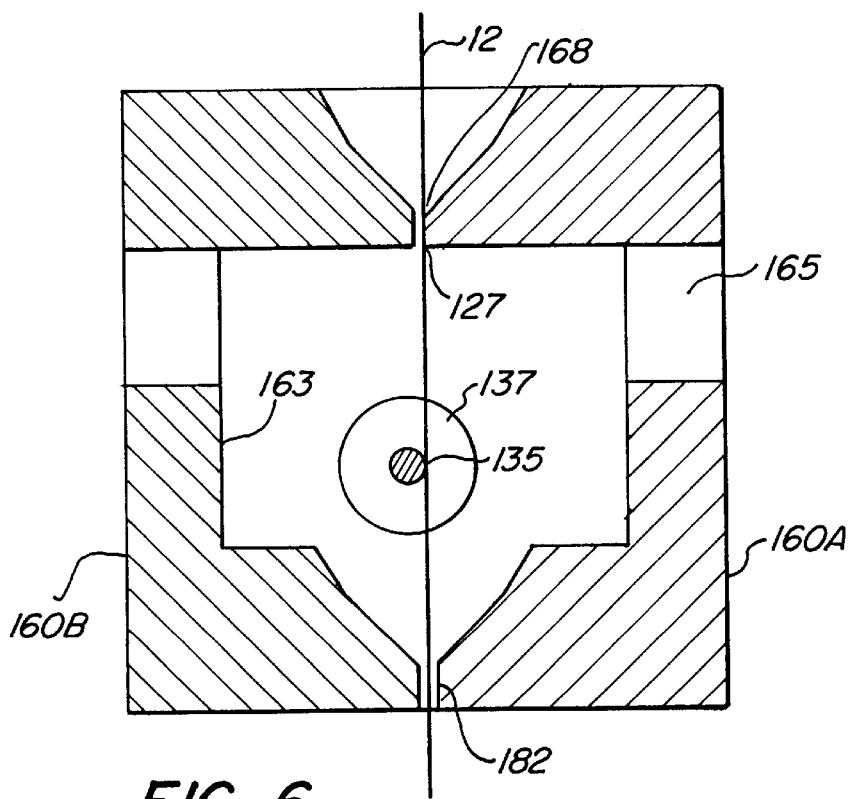
FIG. 6 is a cross-sectional view of the assembled coating applicator shown in FIG. 5 taken along the line 6—6 shown in FIG. 5.
Figure 7:
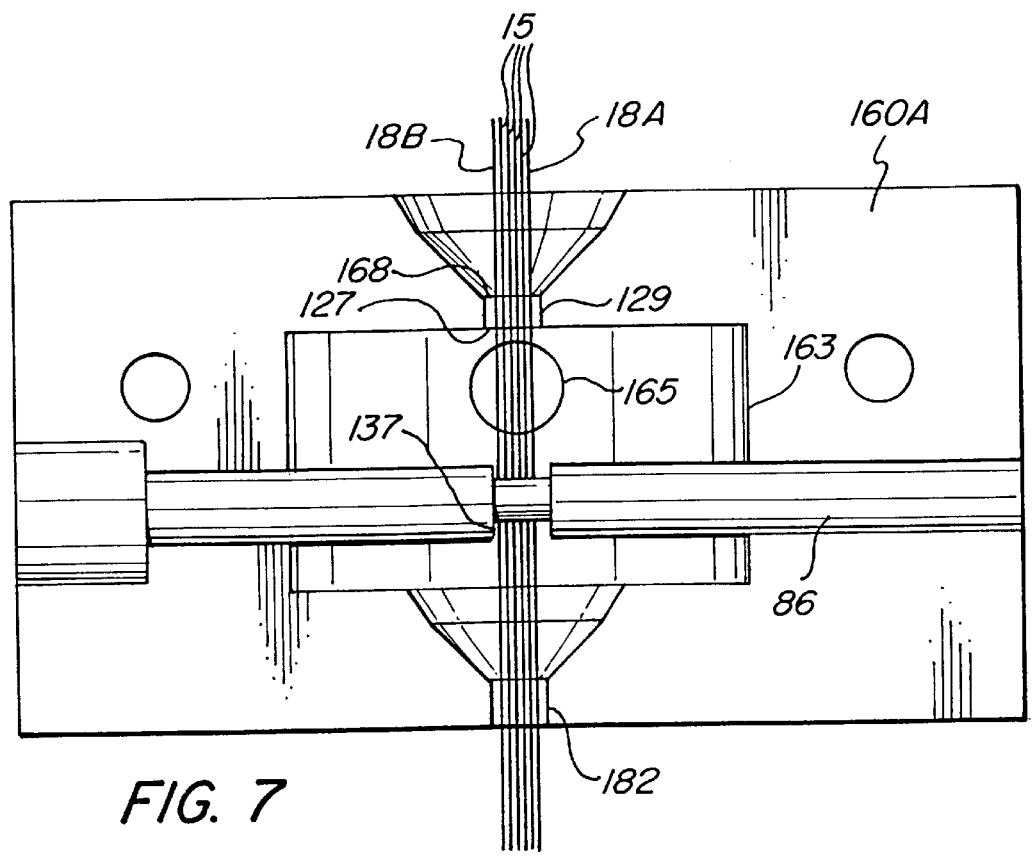
FIG. 7 is a view of one of the blocks shown in FIG. 5 showing the pin assembled in the block.

FIG. 6 shows a cross-section of the embodiment depicted in FIG. 5 taken along the lines 6—6 shown in FIG. 5. FIG. 6 shows that as the plurality of optical fibers 12 pass through the die blocks 160A, 160B, the plurality of optical fibers 12 contact the entrance major trailing edge 127, then pass through the matrix material chamber 163, where matrix material supplied via the matrix material supply orifice 165 (shown in FIG. 5) is applied to the plurality of optical fibers 12. Next, the plurality of optical fibers 12 contact the pin major trailing edge 135. Finally, the coated plurality of optical fibers 12 pass through the exit opening 182. It should be noted that although only one pin 86 is shown, more than one may be used. FIG. 7 shows die block 160A and pin 86 of the second embodiment shown in FIG. 5 with the optical fibers 15, 18A, 18B.

Figure 8:
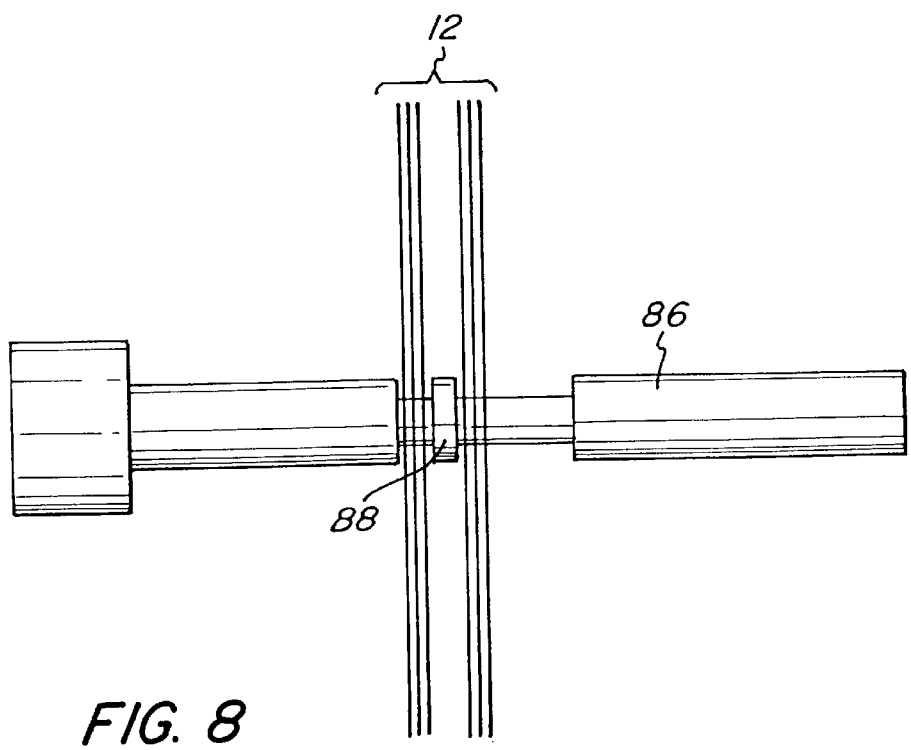
FIG. 8 is a an alternative embodiment of the pin shown in FIG. 5.

FIG. 8 shows an alternative embodiment of the pin 86. In FIG. 8 there is shown a dividing ridge 88 which separates the plurality of optical fibers 12 into two groups. Although dividing ridge 88 is shown as a rectangular extension from the pin 86, the present invention is not limited to a rectangular dividing ridge 88.

The present invention produces an optical fiber ribbon in which the optical fibers are arranged in a plane. Furthermore, the present invention minimizes the space between adjacent optical fibers. In addition, by contacting the optical fibers on both sides of the plurality of optical fibers and contacting both end fibers, the optical fibers are restricted such that the matrix material uniformly covers the optical fibers.

Although the present invention has been described with respect to one or more particular embodiments of the device, it will be understood that other embodiments of the present invention may be made without departing from the spirit and scope of the present invention. Hence, the present invention is deemed limited only by the appended claims and the reasonable interpretation thereof.

What is claimed is:

1. A coating applicator for continuously applying matrix material to a plurality of optical fibers arranged in a ribbon configuration and for at least maintaining such configuration while the material is applied, the coating applicator comprising:
   a die containing:
      a preliminary matrix material application chamber having a first matrix material supply orifice, a first preliminary chamber side containing an entrance opening and a second preliminary chamber side containing an exit opening, the second preliminary chamber side being opposite the first preliminary chamber side, the preliminary chamber entrance opening defining a first guide edge for contacting the plurality of optical fibers on a first side of the plurality of optical fibers, and for contacting a first end fiber of the plurality of optical fibers;
      a main matrix material application chamber having a second matrix material supply orifice, a first main chamber side containing an entrance opening for receiving the optical fibers from the preliminary chamber exit opening and a second main chamber side containing an exit opening, the second main chamber side being opposite the first main chamber side, the main chamber entrance opening defining a second guide edge for contacting a second side of the plurality of optical fibers and for contacting a second end fiber of the plurality of optical fibers, and wherein the position of the main chamber entrance opening is offset relative to the position of the preliminary chamber entrance opening such that the optical fibers are caused to contact the first and second guide edges.

2. A coating applicator for continuously applying matrix material to a plurality of optical fibers arranged in a planar ribbon configuration and for at least maintaining such planar configuration while the material is applied, the coating applicator comprising:
   a die containing a chamber having a matrix material supply orifice, a first side containing an entrance opening and a second side containing an exit opening, the second side being opposite the first side, the entrance opening defining an entrance guide edge for contacting the plurality of optical fibers on a first side of the plurality of optical fibers and for contacting a first end fiber of the plurality of optical fibers; and
   a pin disposed in the chamber, the pin having a pin guide edge for contacting the plurality of optical fibers on a second side of the plurality of optical fibers and for contacting a second end fiber of the plurality of optical fibers, and wherein the position of the pin is offset relative to the position of the entrance opening such that the optical fibers contact the entrance and pin guide edges and align the optical fibers in contact with each other in a single layer in a planar ribbon configuration.

3. A coating applicator for continuously applying matrix material to a plurality of optical fibers arranged in two groups in a planar ribbon configuration and for at least maintaining such planar configuration while the material is applied, the coating applicator comprising:
   a die containing a chamber having a matrix material supply orifice, a first side containing an entrance opening and a second side containing an exit opening, the second side being opposite the first side, the entrance opening defining an entrance guide edge for contacting the plurality of optical fibers on a first side of the plurality of optical fibers and for contacting a first end fiber of the plurality of optical fibers; and
   a pin disposed in the chamber, the pin having a pin guide edge for contacting the plurality of optical fibers on a second side of the plurality of optical fibers and for contacting a second end fiber of the plurality of optical fibers, and wherein the position of the pin is offset relative to the position of the entrance opening such that the optical fibers contact the entrance and pin guide edges and align the optical fibers in a single layer in a planar ribbon configuration, the pin further includes a dividing ridge extending from the pin guide edge to maintain the fibers in two groups, the groups being in a single plane with fibers within each of said two groups being in contact with each other.

4. A coating applicator for continuously applying matrix material to a plurality of optical fibers arranged in a planar ribbon configuration and for at least maintaining such planar configuration while the material is applied, the coating applicator comprising:
   a die containing:
      a matrix material application chamber having therein a first contacting means for contacting the plurality of optical fibers on a first side of the plurality of optical fibers, and for contacting a first end fiber of the plurality of optical fibers; and having a second contacting means for contacting the plurality of optical fibers on a second side of the plurality of optical fibers, and for contacting a second end fiber of the plurality of optical fibers, the second contacting means being spaced downstream from the first contacting means, wherein the second contacting means is located relative to the first contacting means so that the optical fibers are forced to contact the first and second contacting means and align the optical fibers in a single layer in a planar ribbon configuration.

5. A coating applicator according to claim 4, in which the first contacting means is an opening located on a first side of the matrix material application chamber and the second contacting means is an opening located on a second side of the matrix material application chamber.

6. A coating applicator according to claim 4, in which the first contacting means is an opening located on a side of the matrix material application chamber, and the second contacting means is a pin located within the chamber.

7. A coating applicator for continuously applying matrix material to a plurality of optical fibers arranged in groups in a planar ribbon configuration and for at least maintaining such planar configuration while the material is applied, the coating applicator comprising:

a die containing:

a matrix material application chamber having therein a first contacting means comprising an opening located on a side of the matrix material application chamber for contacting the plurality of optical fibers on a first side of the plurality of optical fibers, and for contacting a first end fiber of the plurality of optical fibers; and having a second contacting means comprising a pin located within the chamber for contacting the plurality of optical fibers on a second side of the plurality of optical fibers, and for contacting a second end fiber of the plurality of optical fibers, the second contacting means being spaced downstream from the first contacting means, wherein the second contacting means is located relative to the first contacting means so that the optical fibers are forced to contact the first and second contacting means and align the optical fibers in a single layer in a planar ribbon configuration in which the pin includes a means for dividing the plurality of optical fibers into groups the groups being in a single plane with minimal space between the fibers within each of said groups.

* * * * *